May 1, 1923.
L. B. TAYLOR
1,453,771
AUTOMATIC RETAINER FOR HAYSTACKERS
Filed March 22, 1920  2 Sheets-Sheet 1
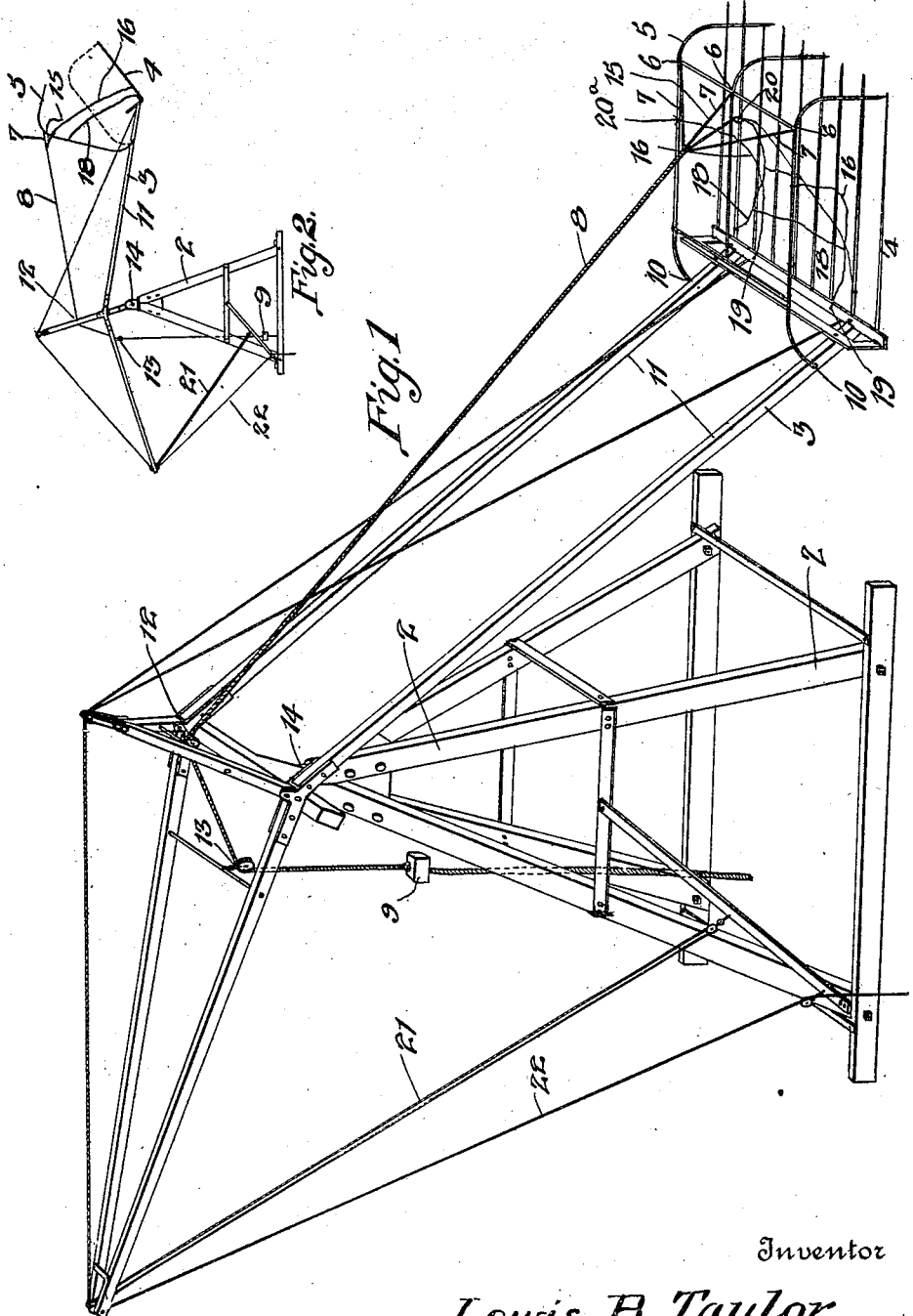
Inventor
Lewis B. Taylor
By Mason Fenwick & Lawrence
Attorneys May 1, 1923.

L. B. TAYLOR

AUTOMATIC RETAINER FOR HAYSTACKERS

Filed March 22, 1920

Inventor

Lewis B. Taylor.

By Mason Fenwick & Lawrence,
Attorneys

Patented May 1, 1923.

1,453,771

UNITED STATES PATENT OFFICE.

LEWIS B. TAYLOR, OF GOODING, IDAHO.

AUTOMATIC RETAINER FOR HAYSTACKERS.

Application filed March 22, 1920. Serial No. 367,810.

*To all whom it may concern:*

Be it known that I, LEWIS B. TAYLOR, citizen of the United States, residing at Gooding, in the county of Gooding and State of Idaho, have invented certain new and useful Improvements in Automatic Retainers for Haystackers; and I do hereby declare the following to be a full, clear, and exact description of the invention, such as will enable others skilled in the art to which it appertains to make and use the same.

This invention relates to new and useful improvements in haystackers or loaders and more particularly to an automatic retainer for the fork portion of the stacker or loader. The main object of the invention is the provision of an automatic retainer for haystackers whereby the retainer will automatically clutch the hay when moved onto the fork portion of a stacker and whereby the retainer will be automatically released upon assuming a predetermined and desired level of elevation of the carrier.

A further object of the invention is to provide means whereby the material, as for instance hay, will upon being forced onto the usual form member of a haystacker automatically close the retainer and a specific means whereby ropes or cables or other obstructions are placed in the path of the hay as it is being loaded onto the carrier so that the pressure of the hay upon these cables closes the retainer.

A further object of this invention is to provide a gravity means and a method of taking advantage of gravity and a counterweight in predetermining the weights and positions and angles of operation of the counterweight relative to predetermined angles of the carrier and unloader so that when the carrier is in a predetermined lowermost position the counterweight will be inoperative to move the retainer but that when the carrier is lifted to a predetermined height, that the angles will be so varied that the counterweight will lift the retainer from the carrier and thereby release the charge of hay or other material on the carrier.

While the invention herein is especially valuable in carriers and hay stackers or loaders, it is understood that the invention herein is not limited thereto.

With these and other objects in view the invention consists in the construction, the combination, the detail, and arrangement of parts as hereinafter more fully described and claimed.

In the drawings:

Figure 1 is a perspective of a hay derrick with a carrier and retainer provided with my invention.

Figure 2 is a side elevation similar to Figure 1 showing the carrier in an elevated position.

Figure 3:
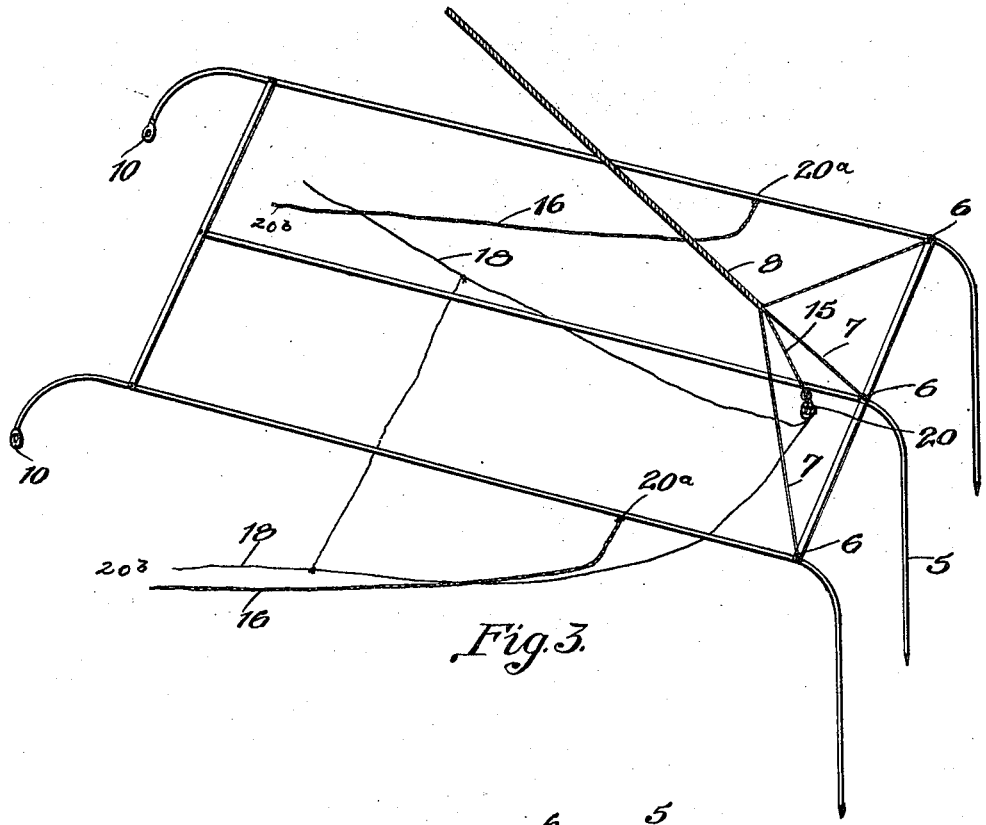
Figure 3 is a fragmentary enlarged view of the retainer with cables thereto attached.
Figure 4:
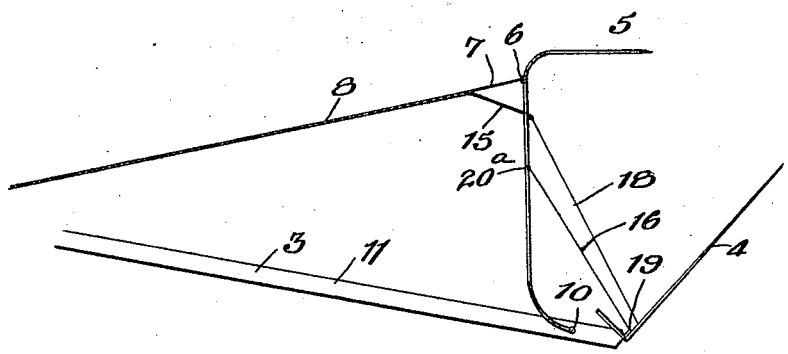
Figure 4 is an enlarged view of the carrier and retainer in an open position of the buck rake.

In the embodiment of my invention there is provided a tower 2 of any approved design, upon which is mounted a crane 3 carrying a carrier 4 and a retainer 5. Attached at three places 6 upon the retainer 5, are three cables 7 joining into a single cable 8, which cable 8 carries on its other end a counterweight 9. The weight of this counterweight 9 is predetermined relative to the angularity and weight of the retainer 5 so that when the unloader is in the position shown in Figure 1, the weight is insufficient to vary the position of the retainer, but when the center of gravity of the retainer changes and the angle of the retainer changes, as shown in Figure 2, the weight will lift the retainer from the dotted line position shown in Figure 2 to the full line position shown in Figure 2. The retainer is pivotally mounted at 10 to beams 11. The cable 8 passes through a pulley 12, which is secured adjacent the crane so as to perform an assisting function in cooperation with the change of the center of gravity in varying the relative angularities such that the opening of the retainer may be accomplished either alone by the change in angularity or alone by the operation of change of center of gravity or by the combined operation of changing the center of gravity and changing the relative angularity, it being understood that broadly the invention contemplates either of these means severally or combined. After passing through pulley 12, cable 8 further passes through pulley 13, the predetermined relation of the cables and pulleys, and retainer and beams and carrier being such that, as shown in Figures 1 and 2 with the methods illustrated therein, the center of gravity is wholly to the right of the pivotal mount 10 of the retainer, and substantially the whole weight of the retainer is to the right of the pivotal mount or on a horizontal plane therewith, but when elevated to the position shown in Figure 2, the center of gravity travels to the left in its upward movement on a pivotal mount 14 of the crane, and this relation is so predetermined that when the carrier has reached the desired elevation, the center of gravity has moved sufficiently toward the left of the pivotal point 10 that the weight will be sufficient to lift the retainer from the position shown in Figure 1 to the full line position shown in Figure 2, which lift is restricted by cables 16, one end of which cables is attached to the retainer at a point marked 20$^a$ and the other end of which is attached to a point on the teeth of the stacker marked 19; there is enough slack in said cables 16 to permit the retainer to be raised a sufficient height to enable a buck rake load of hay to be pushed under the teeth of the retainer and upon the teeth of the stacker. From the junction of cables 8 and 7, a fourth cable, 15, passes to and through a pulley at point 20, whereupon such cable divides, each branch 18 of which passes to and is fastened to or near the point on the stacker teeth marked 19. When the hay is pushed on the stacker teeth by a buck rake, the retainer is in the open position shown in Figure 2, the two cables from point 20 to point 19 being taut and obstructing the passage of the hay, being in the path thereof. The hay when driven upon the stacker teeth pushes backward the cables running from point 20 to points 19 and so flexes such cables as to force the retainer down past its point of equilibrium and into the load of hay, thereby closing the retainer. The cords 18 become slack over the load when the retainer is down, so that these cords offer no opposition to the operation of the gravity device for opening the retainer when the stacker is elevated.

Attention is called to the fact that the carrier 4 which is used in the present instance, is to be of the well known pivoted type of fork member used on haystackers and loaders of this type, said carrier being retained in an operative position by any suitable means which can be manually released at the will of the operator when the carrier is in the position shown in Fig. 2, thus releasing the hay from the carrier after the same has been moved about to the desired position. Attention is called to the fact that should the cables or ropes 16 and 18 become entangled in the load on the carrier so that the retainer 5 will not be released through the counterweight 9 at the proper angle, the hay or other material supported upon the carrier 4 will be released through the manual operation of the operator as the carrier 4 will drop downwardly to release the hay through the will of the operator when the same has been moved to the proper relative position for unloading.

Any approved form of construction for elevating the unloader and crane such as cables 21 and 22 may be employed.

What I claim is:

1. A derrick comprising a pivoted beam with a carrier, a pivoted retainer for holding material on said carrier, and means for disengaging said retainer automatically upon a predetermined change in position of said carrier, said means including a counterweight of predetermined weight connected with the retainer by means of a cable and a pulley adjacent the pivot of the beam for directing the cable.

2. A buck rake unloader comprising a standard, a crane pivotally mounted on said standard, a carrier mounted on one end of said crane and at an obtuse angle thereto, so that when said crane is lowered, said carrier is in substantially horizontal position, a retainer pivotally mounted on said crane adjacent said carrier with substantially the whole weight thereof over said carrier in the latter's horizontal position, a counterweight connected with the retainer, said last mentioned pivotal mounting and weight and the relative angularity of said members being such that when said carrier is elevated to a predetermined height by the movement of said crane, the center of gravity of said retainer moves toward said crane.

3. In a haystacker having a pivoted derrick arm with a carrier at the end thereof, an automatic retainer and buck-rake unloader comprising a frame provided with prongs and pivoted adjacent the end of the derrick arm over the carrier, a cable connected to the forward part of the frame and passing over a pulley adjacent the pivot of the derrick arm and a counterweight secured to the cable in combination with flexible carrier members interposed between the rear of the carrier and the front of the retainer frame as and for the purposes specified.

4. In a derrick, a carrier for material to be transferred comprising a carrier member and means for elevating same, a retainer member for holding said material to said carrier, and means in the path of said material in passing onto said carrier for obstructing said material to close said retainer member.

5. An automatic buck rake unloader comprising a carrier, a retainer pivotally mounted relative to said carrier, flexible members connecting said retainer to said carrier and extending across the path of hay in going onto said carrier so as to cause the hay going onto said carrier to force the said retainer into closed relation with the said carrier.

6. An automatic buck rake unloader comprising a carrier, a retainer pivotally mounted relative to said carrier, flexible members connecting said retainer to said carrier and extending across the path of hay in going onto said carrier so as to cause the hay going onto said carrier to force the said retainer into closed relation with the said carrier, said flexible means including a plurality of cables.

7. An automatic buck rake unloader comprising a carrier, a retainer pivotally mounted relative to said carrier, flexible members connecting said retainer to said carrier and extending across the path of hay in going onto said carrier to force the said retainer into closed relation with the said carrier, said flexible means including a plurality of cables, some of said cables affixed to said unloader and others of said cables affixed to a cable for opening said unloader.

8. In combination in a buck rake unloader having a carrier and a retainer, gravity operated means for opening said retainer relative to the carrier in the latter's elevated position, and means operated by placing the load on the carrier for closing said retainer relative to said carrier.

In testimony whereof I affix my signature.

LEWIS B. TAYLOR.